US012579386B2

(12) United States Patent
Yaginuma et al.

(10) Patent No.: US 12,579,386 B2
(45) Date of Patent: Mar. 17, 2026

(54) WIRELESS TAG COMMUNICATION APPARATUS, METHOD, AND STORAGE MEDIUM

(71) Applicant: Toshiba Tec Kabushiki Kaisha, Tokyo (JP)

(72) Inventors: Jun Yaginuma, Izunokuni Shizuoka (JP); Kento Sugiyama, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/063,254

(22) Filed: Feb. 25, 2025

(65) Prior Publication Data

US 2025/0356145 A1 Nov. 20, 2025

(30) Foreign Application Priority Data

May 16, 2024 (JP) ................................. 2024-080121

(51) Int. Cl.
*G06K 7/10* (2006.01)

(52) U.S. Cl.
CPC ..................... *G06K 7/10128* (2013.01); *G06K 2007/10524* (2013.01)

(58) Field of Classification Search
CPC .................. G06K 7/10128; G06K 2007/10524
USPC ........................................................ 235/451
See application file for complete search history.

(56) References Cited

U.S. PATENT DOCUMENTS

| | | | |
|---|---|---|---|
| 2007/0273531 A1* | 11/2007 | Ando | H01Q 3/26 |
| | | | 340/572.7 |
| 2010/0289624 A1 | 11/2010 | Nakamura | |
| 2019/0236323 A1* | 8/2019 | Trivelpiece | G08B 13/2417 |
| 2020/0065532 A1* | 2/2020 | Yaginuma | G06K 7/10316 |
| 2021/0073487 A1* | 3/2021 | Saegusa | H04B 5/77 |
| 2023/0307827 A1* | 9/2023 | Nakamura | H01Q 1/2216 |
| 2024/0036152 A1* | 2/2024 | Tomiyama | G01S 5/0269 |
| 2024/0095473 A1* | 3/2024 | Sakurai | G01S 5/02 |
| 2024/0095476 A1* | 3/2024 | Sakurai | G06K 7/10366 |
| 2024/0185004 A1* | 6/2024 | Oursland | G01S 13/84 |
| 2024/0280662 A1* | 8/2024 | Huang | G01S 5/0081 |
| 2025/0278583 A1* | 9/2025 | Suzuki | G07G 1/009 |

FOREIGN PATENT DOCUMENTS

| | | |
|---|---|---|
| JP | 2007-085826 A | 4/2007 |
| JP | 2008-102102 A | 5/2008 |

* cited by examiner

*Primary Examiner* — Allyson N Trail
(74) *Attorney, Agent, or Firm* — Kim & Stewart LLP

(57) ABSTRACT

A wireless tag communication apparatus includes a communication device that faces a first direction and configured to communicate with a wireless tag and receive radio waves, a sensor configured to detect positions of the apparatus, a display that is connected to the communication device and faces a second direction, a grip connected to the device, and a processor configured to: determine, as a first position, a midpoint between two positions that are on an arc along which the apparatus is moved, phases of the radio waves received at the two positions being same, determine a second position that is on the arc, calculate a central angle of a sector formed by the first position, the second position, and the arc, determine the position of the wireless tag using the central angle, the first position, and the second position, and control the display to display the determined position.

20 Claims, 10 Drawing Sheets

S: POSITION OF SEARCH TARGET

FIG. 7

WIRELESS TAG COMMUNICATION APPARATUS, METHOD, AND STORAGE MEDIUM

CROSS-REFERENCE TO RELATED APPLICATION(S)

This application is based upon and claims the benefit of priority from Japanese Patent Application No. 2024-080121, filed May 16, 2024, the entire contents of which are incorporated herein by reference.

FIELD

Embodiments described herein relate generally to a wireless tag communication apparatus, a method, and a storage medium.

BACKGROUND

There is a related-art wireless tag communication apparatus aimed at finding an RFID tag (hereinafter, also referred to as a wireless tag) located in an unspecified position. The wireless tag communication apparatus communicates with an RFID tag while changing the position and orientation of an antenna. The wireless tag communication apparatus estimates the direction of an RFID tag to be searched for based on the condition of communication with the RFID tag.

The wireless tag communication apparatus notifies an operator of the direction of the RFID tag by displaying, on a display device, a guidance screen including the estimation result of the direction of the RFID tag. The operator searches for the RFID tag or an object to which the RFID tag is attached while moving in the direction displayed on the display device. In the related art, when information on the distance between the wireless tag communication apparatus and the wireless tag cannot be acquired, the accuracy of the estimation of the direction of the RFID tag is reduced. In addition, the position of the RFID tag cannot be estimated with the related-art method.

SUMMARY OF THE INVENTION

Embodiments of the present invention provide a wireless tag communication apparatus, a method, and a storage medium that can improve the accuracy in estimating the direction of a wireless tag and determining the position of the wireless tag.

According to an aspect of this disclosure, a wireless tag communication apparatus comprises a communication device that faces a first direction and configured to communicate with a wireless tag and receive radio waves from the wireless tag; a sensor configured to detect positions of the wireless tag communication apparatus; a display that is connected to the communication device and faces a second direction that is opposite to the first direction when viewed from above; a grip connected to the communication device; and a processor configured to determine a position of the wireless tag based on phases of the radio waves. The processor is configured to: determine, as a first position, a midpoint between two positions that are on an arc along which the wireless tag communication apparatus is moved, the phases of the radio waves received at the two positions being same, determine a second position that is on the arc and different from the first position, calculate a central angle of a sector formed by the first position, the second position, and the arc, determine the position of the wireless tag using the central angle, the first position, and the second position, and control the display to display the determined position.

BRIEF DESCRIPTION OF THE DRAWINGS

FIG. 7 is a geometric figure for determining the position (or coordinates) of the wireless tag using the first position and the origin.

DETAILED DESCRIPTION

Embodiments of the present invention are described below with reference to the drawings. Various omissions, substitutions, changes, and combinations of components may be made without departing from the spirit of the embodiments. First, a configuration of a wireless tag communication apparatus (which may also be referred to as a wireless tag reading apparatus) according to an embodiment will be described.

Figure 1:
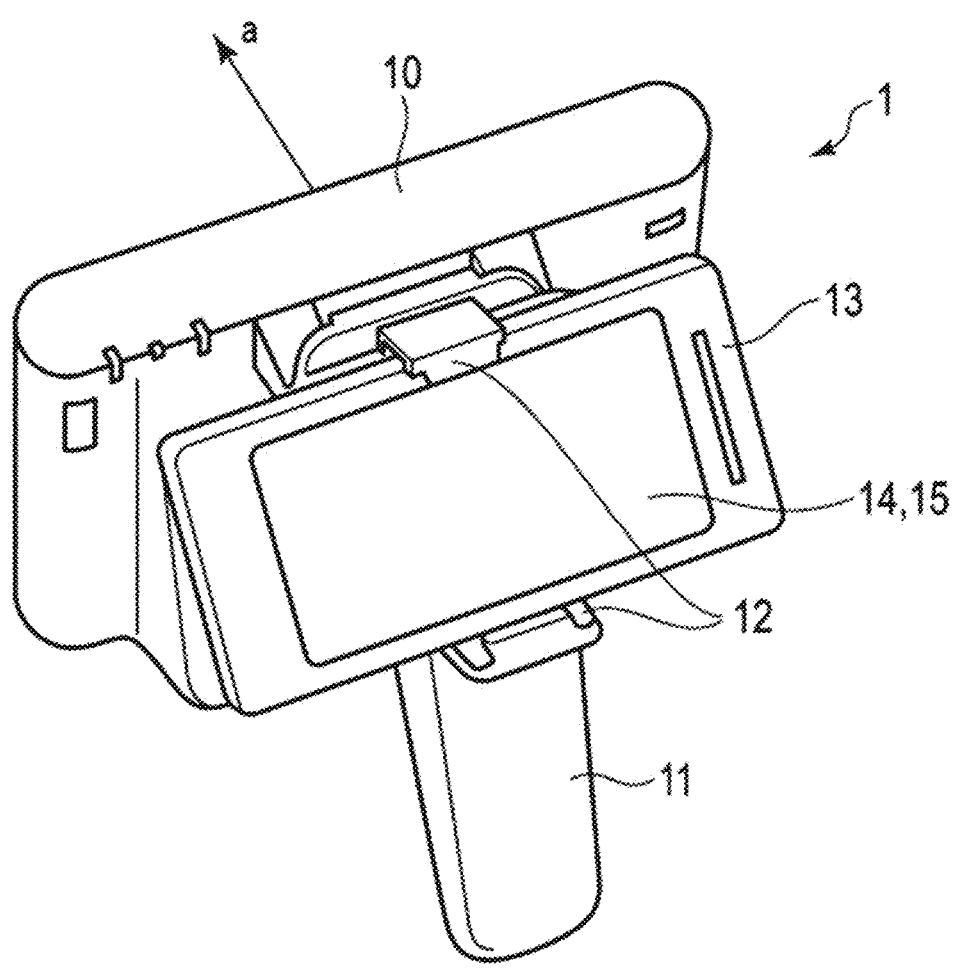
FIG. 1 is a diagram illustrating an example of an external appearance of a wireless tag communication apparatus according to an embodiment.

FIG. 1 is a diagram illustrating an example of an external appearance of a wireless tag communication apparatus 1 according to an embodiment. The wireless tag communication apparatus 1 illustrated in FIG. 1 is a handheld device that is held and operated by an operator. The wireless tag communication apparatus 1 illustrated in FIG. 1 is used as, for example, a search device that searches for an RFID tag (wireless tag) 3 or an object to which the RFID tag 3 is attached.

The wireless tag communication apparatus 1 according to the embodiment communicates with the RFID tag 3. The wireless tag communication apparatus 1 is a wireless tag reading device that reads tag data and the like recorded in the RFID tag 3 by communicating with the RFID tag 3. The wireless tag communication apparatus 1 estimates the position of the RFID tag 3 based on reading results of the RFID tag 3. The wireless tag communication apparatus 1 displays, on a display 14, a guidance screen including information about an estimated position of the RFID tag 3.

The RFID tag 3 is a wireless communication device that operates according to radio waves (output signals) from the wireless tag communication apparatus 1. The RFID tag 3 includes a processor, a memory, a communication circuit, an antenna, and the like. The RFID tag 3 outputs a response signal including tag information recorded in its memory in response to a read command from the wireless tag communication apparatus 1. For example, the RFID tag 3 is attached to an object, such as a commodity or a component. In the RFID tag 3 attached to an object, tag information including information for identifying the object is recorded in the memory.

The wireless tag communication apparatus 1 according to the embodiment is operated by an operator. The wireless tag communication apparatus 1 communicates with a specified RFID tag 3 while being moved. For example, the wireless tag communication apparatus 1 is a handheld device that is held in the hand of and operated by an operator while the operator moves. Furthermore, the wireless tag communication apparatus 1 may be mounted on a mobile body operated by the operator.

The wireless tag communication apparatus 1 according to the embodiment reads the RFID tag 3 attached to an object while changing its position and orientation according to operations performed by the operator. For example, the wireless tag communication apparatus 1 is used as a search device for searching for an object to which the RFID tag 3 is attached and that is located in a predetermined area (search area), such as a warehouse or a store. The wireless tag communication apparatus 1 as a search device continuously reads the RFID tag 3 (or target RFID tag 3) to be searched for while changing its position according to operations performed by the operator.

The wireless tag communication apparatus 1 reads tag data recorded in the RFID tag 3 in a reading area by receiving a response signal from the RFID tag 3. Furthermore, the wireless tag communication apparatus 1 acquires a received signal strength indicator (RSSI), a phase value, and the like from the response (reception) signal from the RFID tag 3. The wireless tag communication apparatus 1 stores, in a memory 22, the tag information, the RSSI value, and the phase value acquired from the received signal, together with information indicating, for example, the position and the orientation of the wireless tag communication apparatus 1.

In the example illustrated in FIG. 1, the wireless tag communication apparatus 1 includes a reader device (or base device) 10 and an information terminal device 13 that functions as a user interface. Alternatively, the wireless tag communication apparatus 1 may be implemented by the reader device 10. In this case, the information terminal device 13 is attached, as an external device providing a user interface, to the wireless tag communication apparatus 1 implemented by the reader device 10.

The reader device 10 includes a housing in which an RFID tag interface including an antenna and a communication control circuit is installed. In the reader device 10, the antenna is disposed such that its directionality is strongest in the direction indicated by an arrow "a" shown in FIG. 1. Here, it is assumed that the direction of the arrow "a" corresponds to the front direction of the wireless tag communication apparatus 1. Also, it is assumed that the front direction of the wireless tag communication apparatus 1 corresponds to the orientation of the antenna.

The reader device 10 includes a grip 11 and a holder 12 in addition to components of a control system described later. The grip 11 is held by the operator. The holder 12 is a jig that holds the information terminal device 13. The holder 12 holds the information terminal device 13 such that the display screen of the display 14 of the information terminal device 13 faces the operator holding the grip 11. The operator holds the grip 11 of the reader device 10 with the information terminal device 13 set in the holder 12 and operates the wireless tag communication apparatus 1.

The information terminal device 13 includes the display 14 and an input device 15. The display 14 and the input device 15 are implemented by, for example, a display device with a touch panel. With the information terminal device 13 set in the holder 12 of the reader device 10, the operator can view a screen displayed by the display 14. Also, with the information terminal device 13 set in the holder 12 of the reader device 10, the operator can input operation instructions using the input device 15.

The wireless tag communication apparatus 1 continuously reads the RFID tag 3 while being operated by the operator. For example, while holding the grip 11, the operator moves to change the position (hereinafter referred to as an apparatus position) of the wireless tag communication apparatus 1 including the antenna. The wireless tag communication apparatus 1 repeatedly reads the RFID tag 3 in a reading area, which is set based on the orientation of the antenna and the strength of the radio wave output from the antenna, while estimating the apparatus position.

The wireless tag communication apparatus 1 estimates the apparatus position by using a self-estimation technique. For example, the wireless tag communication apparatus 1 estimates the apparatus position by, for example, a self-position estimation method used in augmented reality (AR) technologies based on images captured by a camera of the information terminal device 13 or the reader device 10, information acquired by a sensor of the information terminal device 13 or the reader device 10, or the like. However, any other method or configuration may be used to estimate the position of the wireless tag communication apparatus 1 as long as the indoor position of the wireless tag communication apparatus 1 can also be estimated.

The wireless tag communication apparatus 1 estimates the position of the RFID tag 3 based on the reading results of the RFID tag 3 in the reading area set by the orientation of the antenna and the strength of the radio wave output from the antenna. For example, the wireless tag communication apparatus 1 stores, in the memory 22, reading results of the target RFID tag 3 obtained in multiple reading areas that are based on the positions of the wireless tag communication apparatus 1. For example, the wireless tag communication apparatus 1 stores information, such as tag information, an apparatus position, an orientation of the antenna, a power level, and a phase value, in the memory 22 as the reading results of the RFID tag 3. In addition, the wireless tag communication apparatus 1 may store, in the memory 22, a reading area, which is determined based on the apparatus position, the orientation of the antenna, the power level, and the like, as a reading result of the RFID tag 3. The process of estimating the position of the RFID tag 3 will be described later.

Next, a configuration of a control system of the wireless tag communication apparatus 1 according to the embodiment will be described.

Figure 2:
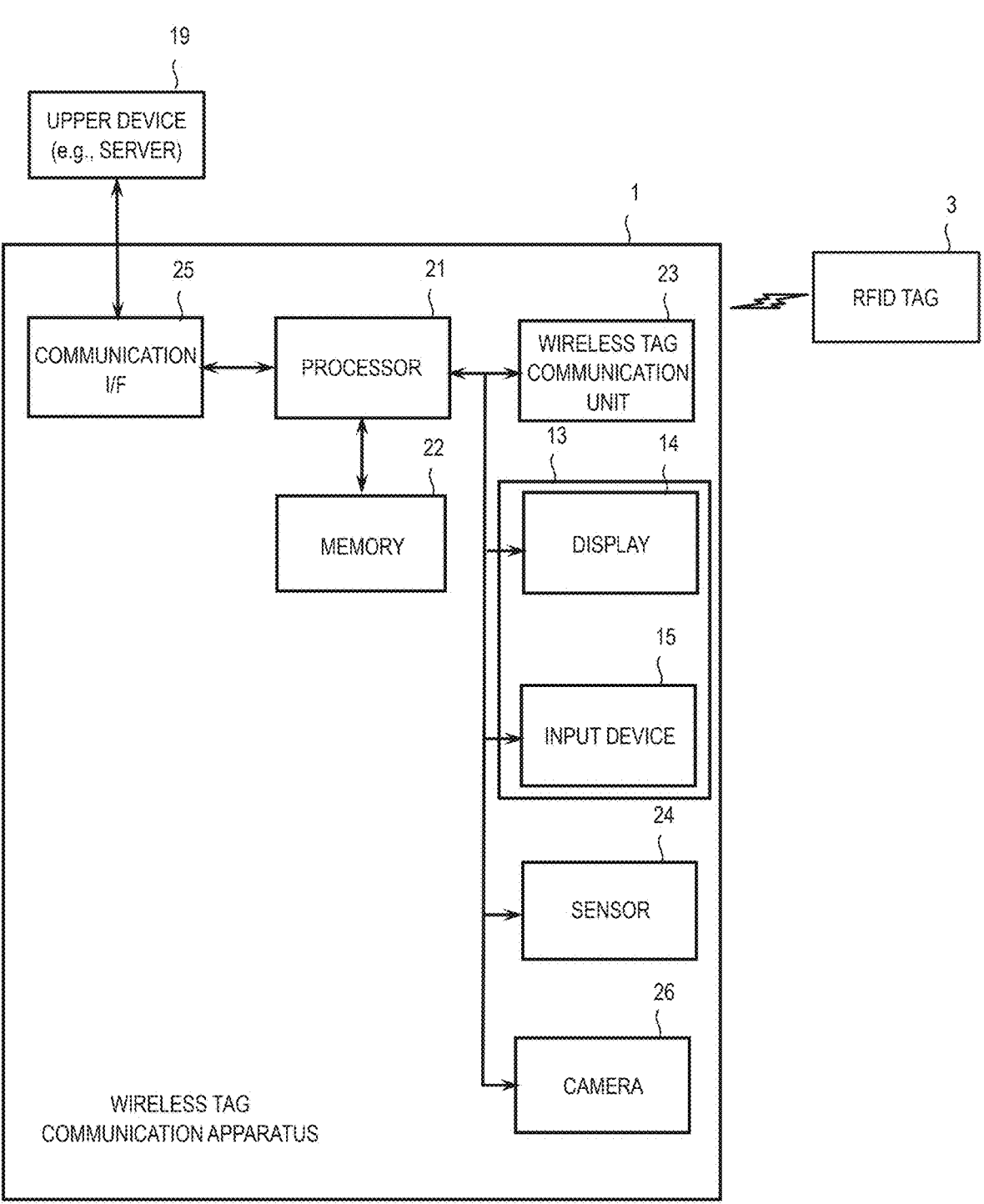
FIG. 2 is a block diagram schematically illustrating a first example of a configuration of a control system of the wireless tag communication apparatus.

FIG. 2 is a block diagram schematically illustrating a first example of a configuration of a control system of the wireless tag communication apparatus 1 according to the embodiment. In the configuration illustrated in FIG. 2, the wireless tag communication apparatus 1 includes a processor 21, a memory 22, a wireless tag communication unit 23, a sensor 24, a communication interface (I/F) 25, a camera 26, a display 14, and an input device 15. As illustrated in FIG. 2, the wireless tag communication apparatus 1 can communicate with the RFID tag 3 via the wireless tag communication unit 23.

The processor 21 controls other components of the wireless tag communication apparatus 1. The processor 21 includes an arithmetic circuit, such as a Central Processing Unit (CPU). The processor 21 controls other components and performs various types of data processing by executing programs. The processor 21 may include an internal memory. The processor 21 performs various processes by executing programs stored in the memory 22 or the like.

The memory 22 includes various types of memories. For example, the memory 22 includes a Read-Only Memory (ROM), a Random Access Memory (RAM), and a Non-Volatile Memory (NVM). The ROM is a non-rewritable, non-volatile memory. The ROM stores programs to be executed by the processor 21. The RAM is a volatile memory that temporarily stores data. The RAM functions as a working memory or a buffer memory.

The NVM of the memory 22 is a rewritable non-volatile memory. The NVM of the memory 22 stores information, such as control information, setting information, and processing results. In addition, the NVM of the memory 22 stores various programs that are executed by the processor 21 to perform various processes described later. For example, the NVM of the memory 22 stores an operation support program for outputting information for supporting the operation of the housing by the operator.

The wireless tag communication unit 23 constitutes an RFID interface that communicates with the RFID tag 3. The wireless tag communication unit 23 is, for example, a communication device including a communication control circuit and an antenna. Alternatively, the wireless tag communication unit 23 may be implemented by a connection interface connected to an external antenna.

In the wireless tag communication unit 23, the communication control circuit includes a control circuit for communicating with the RFID tag 3 via the antenna. The communication control circuit transmits a transmission signal (or a radio wave), which is supplied from the processor 21, from the antenna with a preset power level. The antenna outputs the transmission signal supplied from the communication control circuit as a radio wave that is receivable by the RFID tag 3. The wireless tag communication unit 23 sets a range (reading area or reading range), in which the RFID tag 3 can respond, based on the orientation of the antenna and the power level of the radio wave output from the antenna. The wireless tag communication unit 23 may be referred to as a communication device or a communication unit.

Also, in the wireless tag communication unit 23, the communication control circuit not only outputs a transmission signal to the antenna but also supplies a signal received via the antenna to the processor 21 as reception data. The communication control circuit receives a response signal from the RFID tag 3 via the antenna, processes the response signal (or reception signal) received via the antenna, and supplies the processed response signal to the processor 21. For example, the communication control circuit supplies the processor 21 with tag information included in the reception signal from the RFID tag 3, a Received Signal Strength Indicator (RSSI) indicating the strength of the reception signal, and the phase value of the reception signal.

The sensor (or sensor group) 24 detects the movement of the wireless tag communication apparatus 1. For example, the sensor 24 is an acceleration sensor, a gyro sensor, a geomagnetic (azimuth) sensor, or the like. The sensor 24 may include multiple types of sensors. The sensor 24 may include a position detection sensor that detects the position of the wireless tag communication apparatus 1. The sensor 24 is an example of a position detection sensor.

The communication interface 25 is used for communication with an external device. For example, the communication interface 25 is used for communication with an upper device 19, such as a server. The communication interface 25 may be a wired communication interface or a wireless communication interface.

The camera 26 captures images of the surroundings of the wireless tag communication apparatus 1. The shooting direction of the camera 26 changes according to the orientation of the wireless tag communication apparatus 1. For example, the shooting direction of the camera 26 may be set to coincide with the orientation of the antenna of the wireless tag communication unit 23. Images captured by the camera 26 are used to estimate the position (or apparatus position) of the wireless tag communication apparatus 1. The camera 26 is an example of a position detection sensor. For example, the wireless tag communication apparatus 1 estimates its own position by using a self-position estimation method used in the augmented reality (AR) technology based on the images captured by the camera 26. The position of the wireless tag communication apparatus 1 may be estimated not only based on the output from the position detection sensor but also based on an output from any another device.

The display 14 and the input device 15 included in the information terminal device 13 are connected to the processor 21 via an internal interface. The display 14 displays information. For example, the display 14 displays a display screen according to an instruction from the processor 21. The display 14 may be implemented by, for example, a display device including Light Emitting Diodes (LEDs). Note that the display 14 may include a sound device, such as a buzzer or a speaker. Instead of the display 14, the information terminal device 13 may include an interface connectable to an external display device and an external sound device. In this case, the display 14 corresponds to, for example, an external display device and an external sound device.

The input device 15 is used by the operator to input operation instructions or the like. The input device 15 is implemented by, for example, hardware switches/buttons or a touch panel that also functions as the display 14. Instead of the input device 15, the information terminal device 13 may include an interface that is connectable to external hardware switches/buttons or an external touch panel that also functions as the display 14. The input device 15 supplies information input by the operator to the processor 21.

The wireless tag communication apparatus 1 includes a power supply for supplying power for operation. In the handheld wireless tag communication apparatus 1, for example, a rechargeable battery (or secondary battery) is provided as a power supply. The battery supplies power for the operation of each component in the wireless tag communication apparatus 1. Note that the wireless tag communication apparatus 1 may have a configuration in which the camera 26 is replaced with a device for detecting the position of the wireless tag communication apparatus 1.

Next, a second example of a configuration of a control system of the wireless tag communication apparatus 1 according to the embodiment will be described.

Figure 3:
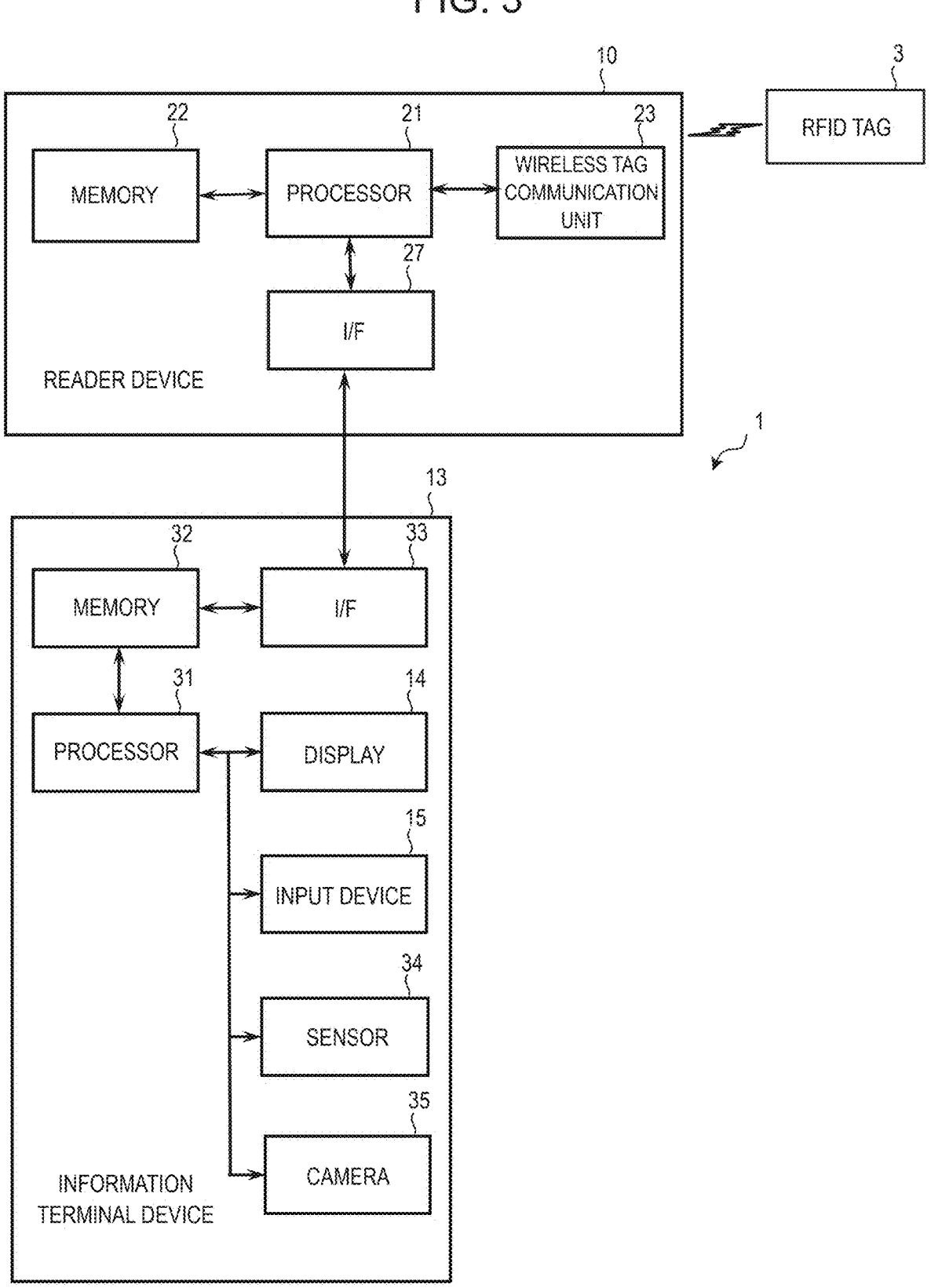
FIG. 3 is a block diagram schematically illustrating a second example of a configuration of a control system of the wireless tag communication apparatus.

FIG. 3 is a block diagram schematically illustrating a second example of a configuration of a control system of the wireless tag communication apparatus 1 according to the embodiment. In the example illustrated in FIG. 3, the reader device 10 implementing the wireless tag communication apparatus 1 is connected to the information terminal device 13 provided as an external device. The reader device 10 implementing the wireless tag communication apparatus 1 includes a processor 21, a memory 22, a wireless tag communication unit 23, and an interface (I/F) 27.

The processor 21 controls other components of the reader device 10. The processor 21 includes an arithmetic circuit, such as a CPU. The processor 21 controls other components and performs various types of data processing by executing programs. The processor 21 may include an internal memory. The processor 21 performs various processes by executing programs stored in the memory 22 or the like.

The memory 22 includes various types of memories. For example, the memory 22 includes a ROM, a RAM, and an NVM. The ROM is a non-rewritable, non-volatile memory. The ROM stores programs to be executed by the processor 21. The RAM is a volatile memory that temporarily stores data. The RAM functions as a working memory or a buffer memory. The NVM is a rewritable non-volatile memory. The NVM stores information, such as control information, setting information, and processing results. The NVM of the memory 22 stores various programs that are executed by the processor 21 to perform various processes described later.

The wireless tag communication unit 23 constitutes an RFID interface that communicates with the RFID tag 3. The wireless tag communication unit 23 is a communication device including a communication control circuit and an antenna. Alternatively, the wireless tag communication unit 23 may be implemented by a connection interface connected to an external antenna.

In the wireless tag communication unit 23, the communication control circuit includes a control circuit for communicating with the RFID tag 3 via the antenna. The communication control circuit transmits a transmission signal (or a radio wave), which is supplied from the processor 21, from the antenna with a preset power level. The antenna outputs the transmission signal supplied from the communication control circuit as a radio wave that is receivable by the RFID tag 3. The wireless tag communication unit 23 sets a range (or reading area), in which the RFID tag 3 can respond, based on the orientation of the antenna and the power level of the radio wave output from the antenna.

Also, in the wireless tag communication unit 23, the communication control circuit not only outputs a transmission signal to the antenna but also supplies a signal received via the antenna to the processor 21 as reception data. The communication control circuit receives a response signal from the RFID tag 3 via the antenna, processes the response signal (or reception signal) received via the antenna, and supplies the processed response signal to the processor 21. For example, the communication control circuit supplies the processor 21 with tag information included in the reception signal from the RFID tag 3, an RSSI indicating the strength of the reception signal, and the phase value of the reception signal.

The interface 27 may be any interface that is compliant with an interface 33 included in the information terminal device 13. For example, the interface 27 may be physically in contact with and connected to an interface, such as a Universal Serial Bus (USB) interface or a LAN interface, included in the information terminal device 13. The interface 27 may instead be a wireless communication interface, such as a Bluetooth (registered trademark) interface or a Wi-Fi (registered trademark) interface.

The reader device 10 implementing the wireless tag communication apparatus 1 includes a power supply for supplying power for operation. In the handheld wireless tag communication apparatus 1, for example, a rechargeable battery (or secondary battery) is provided as a power supply.

The battery supplies the power for the operation of each component in the wireless tag communication apparatus 1.

In the example illustrated in FIG. 3, the information terminal device 13 is set in the holder 12 of the reader device 10 implementing the wireless tag communication apparatus 1. The information terminal device 13 may be any device that includes a display 14, an input device 15, and the like, and is connected for communication to the reader device 10 implementing the wireless tag communication apparatus 1. The information terminal device 13 is, for example, a portable information processing device, such as a smart phone or a tablet PC. As illustrated in FIG. 3, the information terminal device 13 includes a processor 31, a memory 32, an interface (I/F) 33, a sensor 34, a camera 35, a display 14, and an input device 15.

The processor 31 controls other components of the information terminal device 13 and performs various types of data processing. The processor 31 is, for example, a CPU. The processor 31 performs various processes by executing programs stored in the memory 32.

The interface 33 (or a second communication interface) communicates with the interface 27. The interface 33 is compliant with the interface 27. For example, the interface 33 is a LAN interface, a USB interface, a Bluetooth interface, or a Wi-Fi_33 interface.

The sensor (or sensor group) 34 includes a sensor that detects the movement of the information terminal device 13. For example, the sensor 34 is an acceleration sensor, a gyro sensor, a geomagnetic (or azimuth) sensor, or the like. The sensor 34 may include multiple types of sensors. The sensor 34 may include a position detection sensor for detecting the position of the information terminal device 13. In this case, the sensor 34 is an example of a position detection sensor. Note that some or all of the sensors included in the sensor 34 described above may be included in the reader device 10.

The camera 35, for example, captures images of the surroundings of the wireless tag communication apparatus 1. The shooting direction of the camera 35 changes according to the orientation of the reader device 10 when the information terminal device 13 is attached to the reader device 10. For example, the shooting direction of the camera 35 may be set to coincide with the orientation of the antenna of the wireless tag communication unit 23 included in the reader device 10.

Images captured by the camera 35 are used to estimate the position of the information terminal device 13 (or the wireless tag communication apparatus 1 including the reader device 10 to which the information terminal device 13 is attached). The camera 35 is an example of a position detection sensor. For example, the processor 31 of the information terminal device 13 estimates the position of the information terminal device 13 by using a self-position estimation method used in AR technologies based on the images captured by the camera 35. The apparatus position may be estimated not only based on the output from the position detection sensor but also based on an output from another device.

Next, a configuration of the wireless tag communication unit 23 in the wireless tag communication apparatus 1 according to the embodiment will be described in detail.

As described above, the wireless tag communication unit 23 includes a communication control circuit and an antenna. The communication control circuit of the wireless tag communication unit 23 includes a modulation circuit, a transmission-side amplifier circuit, a coupler, a reception-side amplifier circuit, a demodulation circuit, a power level setting circuit, and a level detection circuit. The antenna of the wireless tag communication unit 23 is connected to the coupler of the communication control circuit. The antenna transmits and receives radio waves for communication with the RFID tag 3. The communication control circuit processes signals to be transmitted to the RFID tag 3 via the antenna and signals received from the RFID tag 3.

The modulation circuit modulates a waveform signal (or a carrier wave) according to input transmission data. The transmission-side amplifier circuit amplifies an output signal of the modulation circuit. The coupler supplies the output signal amplified by the transmission-side amplifier circuit to the antenna. With this configuration, the communication control circuit outputs a carrier wave modulated with transmission data from the antenna.

The RFID tag 3 receives a radio wave as a transmission signal transmitted from the antenna. The RFID tag 3 recognizes, for example, a read command included in the transmission signal transmitted from the antenna. When recognizing the read command, the RFID tag 3 outputs data (or tag information) stored in its memory as a radio wave by, for example, backscatter modulation.

The antenna receives the radio wave as a reception signal output from the RFID tag 3. The communication control circuit acquires the reception signal received by the antenna via the coupler and supplies the acquired reception signal to the reception-side amplifier circuit. The reception-side amplifier circuit amplifies the reception signal received by the antenna. The demodulation circuit demodulates the data (or tag information) included in the reception signal amplified by the reception-side amplifier circuit.

The antenna of the wireless tag communication unit 23 has directionality and is installed in a predetermined position of the wireless tag communication apparatus 1 to face a predetermined direction. The antenna is, for example, a planar antenna. However, the antenna of the wireless tag communication unit 23 is not limited to a planar antenna. The antenna is disposed in the housing to transmit an electromagnetic wave (or output signal) toward a communication area (or reading area) that is centered on a direction in which the directionality is maximized (for example, the direction "a" shown in FIG. 1). The wireless tag communication apparatus 1 is configured such that the direction in which the directivity of the antenna is maximized corresponds to the forward direction (e.g., the direction "a" shown in FIG. 1).

The communication control circuit of the wireless tag communication unit 23 sets the strength (or power level) of an output signal by using the output setting circuit. The transmission-side amplifier circuit amplifies the output signal supplied from the modulation circuit to have a power level set by the output setting circuit. The antenna transmits the output signal (or radio wave) that has the power level set by the output setting circuit and is supplied from the transmission-side amplifier circuit via the coupler.

The wireless tag communication unit 23 sets a range (or reading area), in which the RFID tag 3 can respond to a radio wave, according to the orientation of the antenna and the power level of the radio wave output from the antenna. The reading area is set by the wireless tag communication unit 23 based on the orientation of the antenna, the directivity of the antenna, and the power level of the output signal. The wireless tag communication unit 23 sets the reading area by controlling the power level of the output signal according to an instruction from the processor 21.

The communication control circuit of the wireless tag communication unit 23 processes a response signal (or reception signal) received by the antenna and supplies the response signal (or reception signal) to the processor 21. The communication control circuit supplies the processor 21 with tag information included in the reception signal from the RFID tag 3, the RSSI indicating the strength of the reception signal, and the phase value of the reception signal. For example, the communication control circuit of the wireless tag communication unit 23 uses a level detection circuit to detect information for determining the RSSI indicating the strength of the reception signal (a response signal from the RFID tag 3) received by the antenna. Also, the processor 21 acquires the phase values of multiple reception signals received by the communication control circuit of the wireless tag communication unit 23 at different positions and detects the phase differences between the reception signals received at the different positions.

Next, a process (hereinafter referred to as a tag position estimation process) for improving the accuracy in determining the direction of the wireless tag (RFID tag) 3 and estimating (or determining) the position of the wireless tag 3 will be described. The tag position estimation process is performed by the processor 21 of the wireless tag communication apparatus 1, the processor of the upper device 19, the processor 21 of the reader device 10, or the processor 31 of the information terminal device 13. The processor that performs the tag position estimation process may be referred to as a determining unit or an estimating unit.

Figure 4:
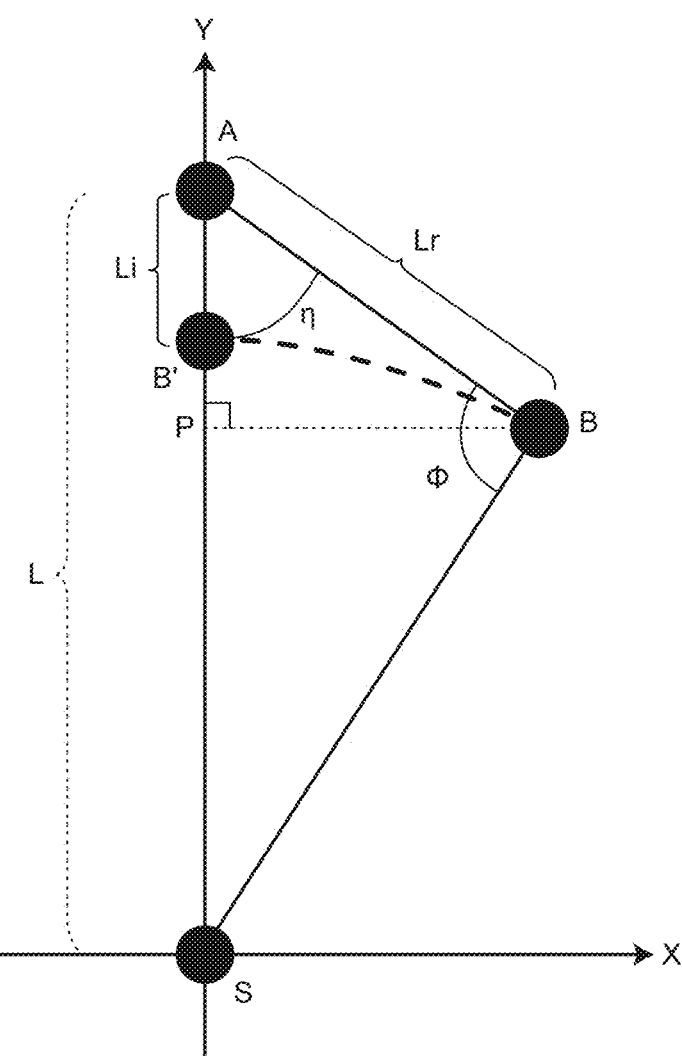
FIG. 4 is a diagram for describing calculation of the direction of an RFID tag.

First, a method of calculating the direction of the RFID tag 3 will be described. FIG. 4 is a diagram for describing the calculation of the direction of the RFID tag 3. In FIG. 4, it is assumed that the wireless tag communication apparatus 1 moves from a point A to a point B. In FIG. 4, a point S indicates the position of the wireless tag 3 (the position of the search object) to be searched for. The point A indicates the position of the wireless tag communication apparatus 1. The point B indicates the position of the wireless tag communication apparatus 1 moved from the point A. A point B' indicates a position that is on a straight line connecting the point S to the point A and is away from the point S by the distance between the points S and B, that is, a position at which SB=SB'. An angle η indicates the angle SAB. Also, an angle φ indicates the angle SBA.

As shown in FIG. 4, the distance between the points A and B is Lr, the distance between the points S and A is L, and the distance between the points A and B' is Li. Also, as shown in FIG. 4, a point P refers to the intersection point between a perpendicular from the point B to a line SA (or the foot of the perpendicular from the point B to the line SA). In a right-angled triangle SPB, the length of a line SB is equal to the length of a line SB' and is represented by L-Li. The length of a line SP is expressed by L−Lr·cos η. The length of a line PB is expressed by Lr·sin η. In this case, the relation between the distance L between the points S and A and the angle η is expressed by formula (1) below according to the Pythagorean theorem for the right-angled triangle SPB.

$$\text{Cos } \eta = (Lr2 + 2 \cdot L \cdot Li - Li2)/2LLr$$

$$L = (Lr2 - Li2)/(2(Lr \cdot \cos \eta - Li)) \tag{1}$$

Figure 5:
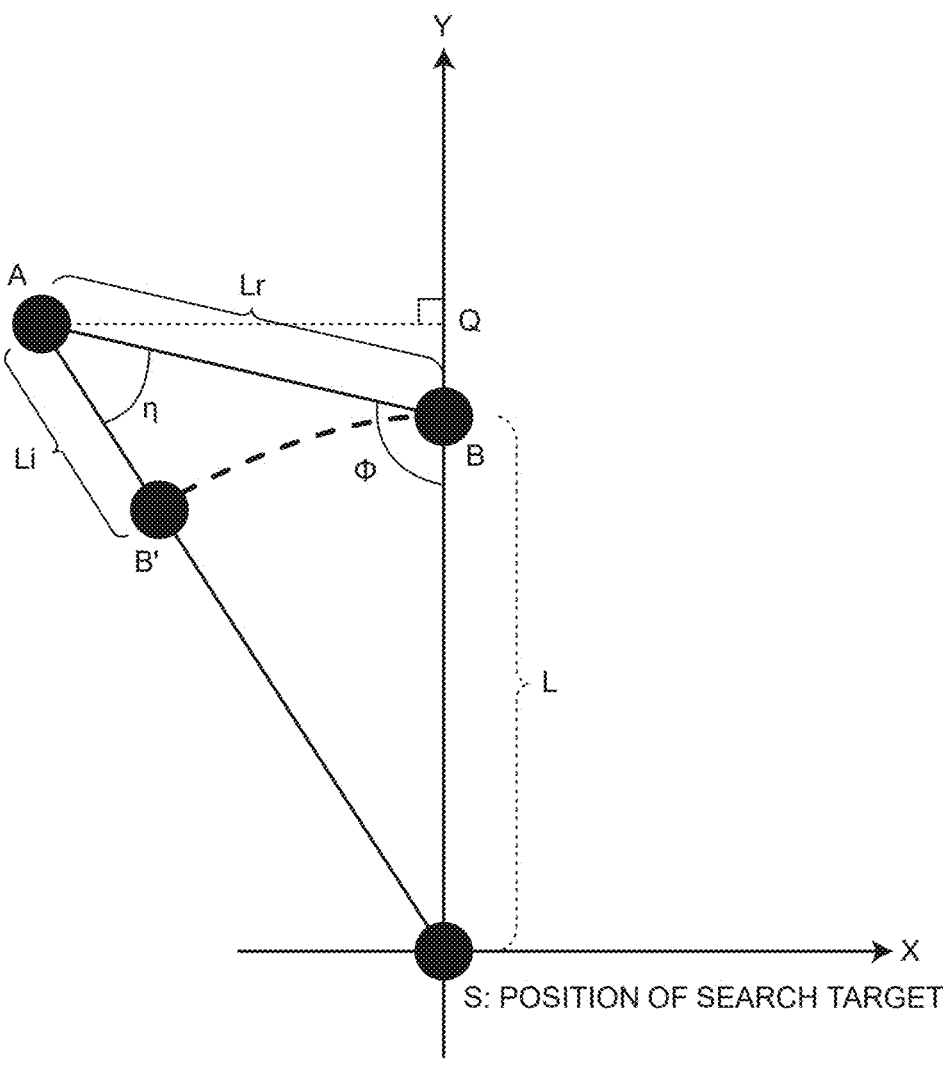
FIG. 5 is a diagram for describing calculation of the direction of an RFID tag.

FIG. 5 is a diagram for describing the calculation of the direction of the RFID tag 3. In FIG. 5, it is assumed that the wireless tag communication apparatus 1 moves from a point B to a point A. Also, as shown in FIG. 5, a point Q refers to the intersection point between a perpendicular from the point A to a straight line SB (or the foot of the perpendicular from the point A to the line SB). In a right-angled triangle SQA, the length of a line SA is SB'+B'A and is therefore represented by L+Li. The length of a line SQ is represented by Lr·sinφ. The length of a line QB is represented by −Lr·cos φ. Therefore, the length of the line SQ is L−Lr·cos φ. In this case, the relation between the distance L between the points S and B and the angle φ is expressed by formula (2) below according to the Pythagorean theorem for the right-angled triangle SQA.

$$Cos\ φ=(Lr2−2·L·Li−Li2)/2LLr$$

$$L=(Lr2−Li2)/(2(Lr·cos\ φ+Li))\qquad(2)$$

Because formula (2) represents the movement of the wireless tag communication apparatus 1 from the point B to the point A, it is possible to derive formula (2) from formula (1) by changing Li in formula (1) to "−Li". In formulas (1) and (2), the distance Lr and the distance Li are measured values. The distance Li is calculated by the processor 21 or the like by using the phase difference between reception signals received from the RFID tag 3 at the points A and B. The distance Lr is calculated by the processor 21 or the like by using the positions (or coordinates) of the wireless tag communication apparatus 1 at the point A and the point B.

In the related art, the angle η and the angle φ corresponding to the direction of the RFID tag 3 are calculated by setting the distance L to a predetermined length. For this reason, with the related art, the calculated direction of the RFID tag 3 tends to become inaccurate. On the other hand, in the present embodiment, the distance L is calculated using a method described below, and the calculated distance L is used in formulas (1) and (2) to determine the direction of the RFID tag 3.

Figure 6:
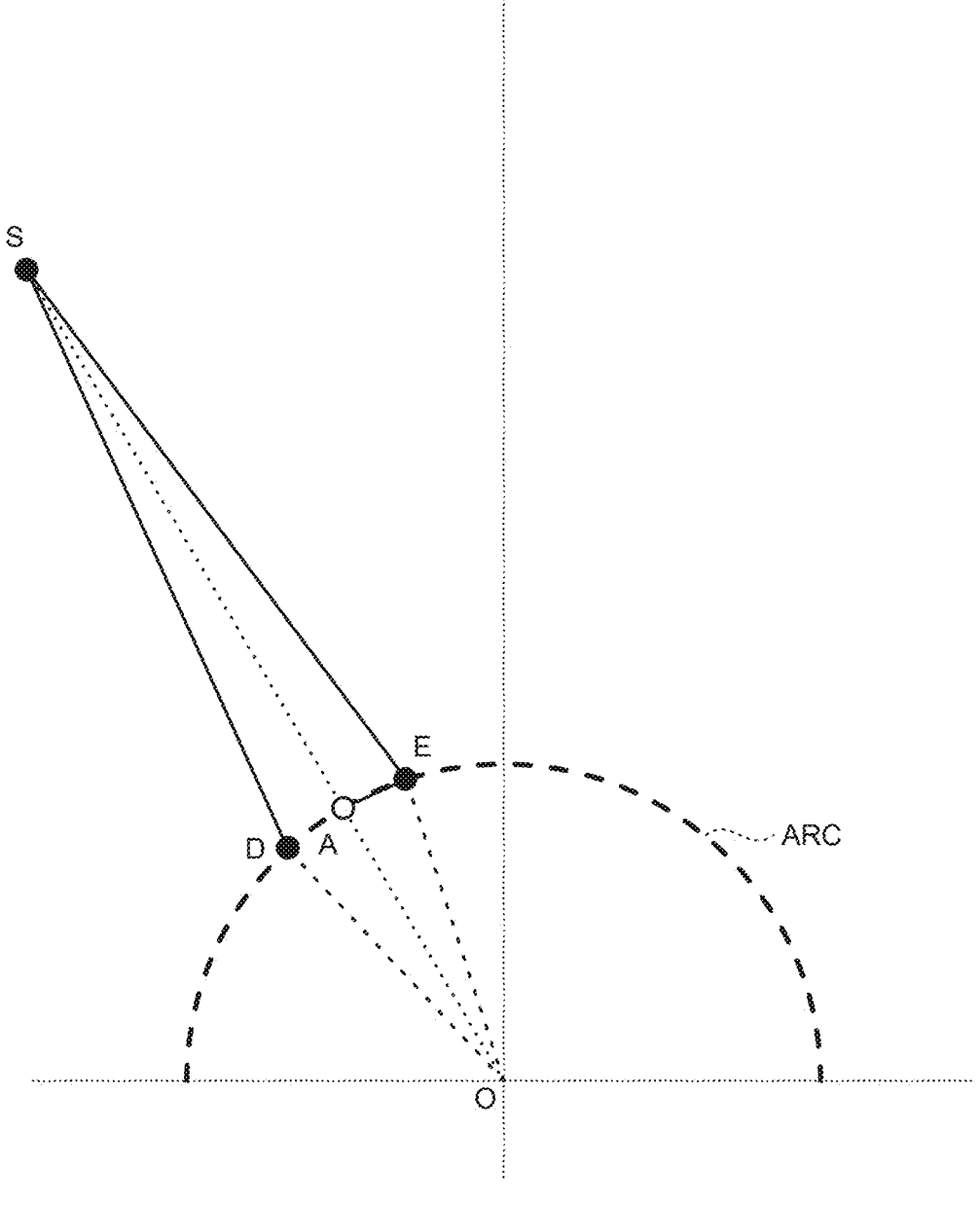
FIG. 6 is a geometric figure for determining a first position in determining the distance between a wireless tag and the first position.

FIG. 6 is an example of a geometric figure for determining the point A in determining the distance L. Hereinafter, the point A is referred to as a first position. In FIG. 6, it is assumed that the wireless tag communication unit (or communication device) 23 is moved along an arc ARC. The movement of the wireless tag communication unit (or communication device) 23 along the arc ARC corresponds to, for example, an operation in which the operator, who is holding the wireless tag communication apparatus 1 or the reader device 10 and positioned at an origin O, bends his/her elbow to level the forearm and moves the wireless tag communication apparatus 1 or the reader device 10 along a horizontal plane (this operation is hereinafter referred to as a rotation operation). In this case, the processor 21 acquires a phase value at each of multiple points on the arc ARC via the wireless tag communication unit 23. The processor 21 identifies two identical phase values among the multiple phase values corresponding to the multiple points. Note that the rotation operation is not limited to the example described above and may be, for example, an operation in which the operator holding the wireless tag communication apparatus 1 or the reader device 10 changes his/her orientation.

In FIG. 6, a point D and a point E correspond to the positions of the wireless tag communication apparatus 1 or the reader device 10 at which radio waves with the same phase value are received. That is, the point D and the point E correspond to two positions at which radio waves with the same phase value are received. In this case, the processor 21 estimates the apparatus position (or coordinates) at the point D based on an output from the position detection sensor at the point D. Also, the processor 21 estimates the apparatus position (or coordinates) at the point E based on an output from the position detection sensor at the point E.

The processor 21 then uses the estimated position at the point D and the estimated position at the point E to determine the coordinates of the origin O. In addition, the processor 21 determines the coordinates of a midpoint between the estimated position at the point D and the estimated position at the point E. The processor 21 uses the determined midpoint as the first position A. That is, the processor 21 determines, as the first position A, the midpoint between the two positions at which radio waves with the same phase value are received while the communication device 23 is moved along the arc ARC. As shown in FIG. 6, the first position A is located on a straight line connecting the origin O to the position S of the wireless tag 3. Also, as shown in FIG. 6, the first position A corresponds to a position on the arc ARC that is closest to the position S of the wireless tag 3.

Figure 7:
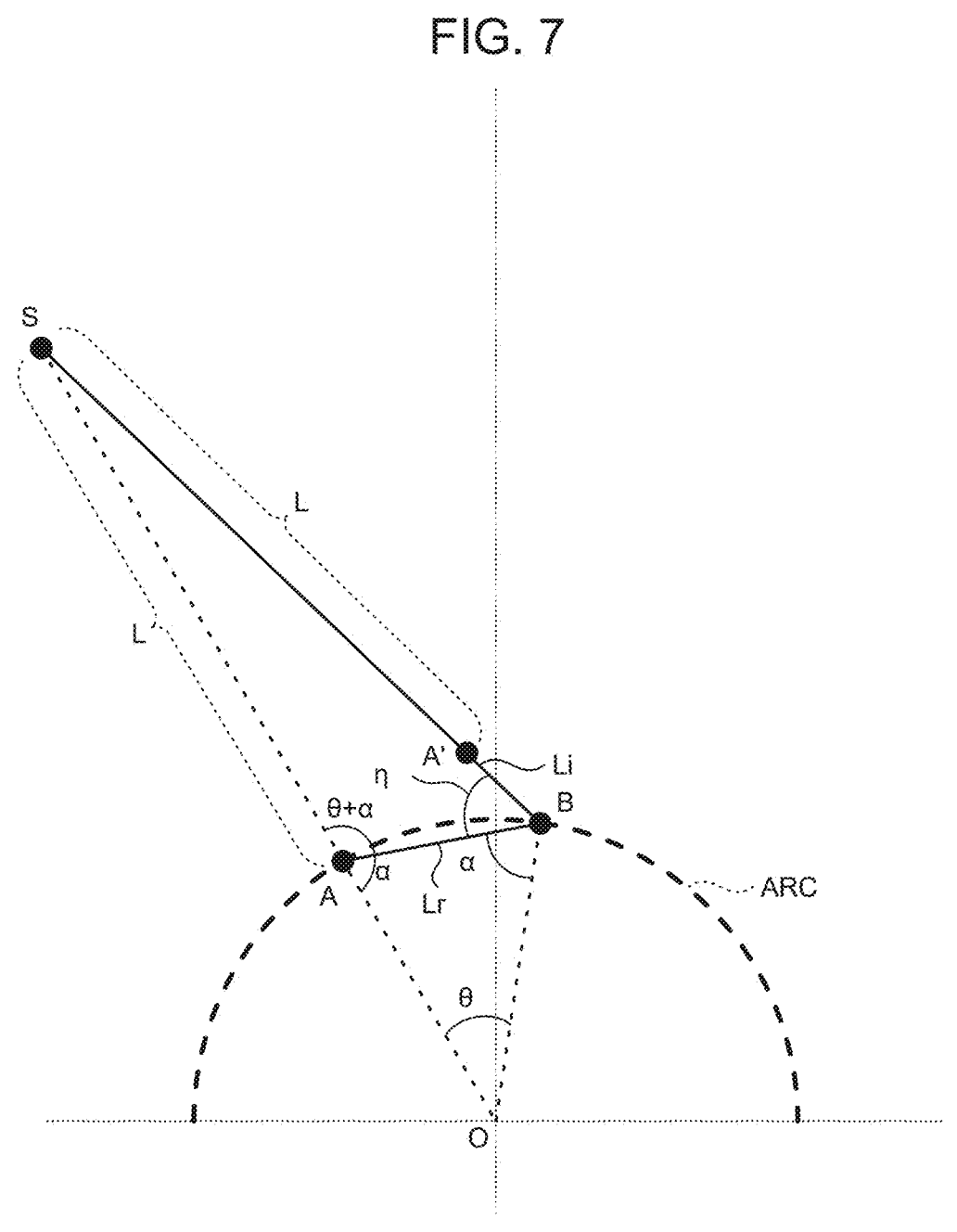

FIG. 7 is an example of a geometric figure for determining the position (or coordinates) of the wireless tag 3 using the first position A and the origin O determined in FIG. 6. As shown in FIG. 7, the origin O corresponds to the center point of the arc ARC. As shown in FIG. 7, the operator moves the wireless tag communication apparatus 1 or the reader device 10 from the first position A to a second position B that is on the arc ARC and different from the first position A. The arc ARC is centered on the origin O and has a radius corresponding to the distance between the origin O and the first position A. The movement corresponds to a rotation operation of the wireless tag communication apparatus 1 or the reader device 10. In this case, the processor 21 estimates the position (or coordinates) of the wireless tag communication apparatus 1 at the point B based on an output from the position detection sensor at the point B. Thus, as illustrated in FIG. 7, the processor 21 determines, as the second position B, a position (or coordinates) that differs from the first position A and is in the moving path of the communication device 23 along the arc ARC.

As shown in FIG. 7, the first position A, the second position B, and the origin (or center point) O form an isosceles triangle. The processor 21 calculates a central angle θ of a sector formed by the first position A, the second position B, and the arc ARC by using the coordinates of the first position A, the second position B, and the origin O. The central angle θ is calculated using, for example, the distance (or radius) between the origin O and the first position A and a distance Lr between the first position A and the second position B.

As shown in FIG. 7, the processor 21 calculates two base angles (angle OAB and angle OBA) α in the isosceles triangle by using the central angle θ. Also, as shown in FIG. 7, the processor 21 calculates an exterior angle (θ+α) of the isosceles triangle, which is formed when a side of the isosceles triangle including the center point O is extended toward the wireless tag 3, by using the central angle θ and the base angles α.

A position A' shown in FIG. 7 indicates a position that is on a straight line connecting the position S of the wireless tag 3 to the second position B and is away from the position S of the wireless tag 3 by a distance L (hereinafter referred to as a first distance) between the wireless tag 3 and the first position A. As shown in FIG. 7, a distance Li between the point A' and the point B corresponds to the difference (hereinafter referred to as a first difference) between the first distance L and the distance from the RFID tag 3 to the second position B. Therefore, the distance Li is calculated by the processor 21 or the like using the phase difference between the reception signals received from the RFID tag 3 at the points A and B. Furthermore, the processor 21 calculates a distance (hereinafter referred to as a second distance) Lr between the first position A and the second position B by using the coordinates of the first position A and the second position B.

Thus, the processor 21 calculates the exterior angle ($\theta+\alpha$), the first difference Li, and the second distance Lr illustrated in FIG. 7. Then, the processor 21 calculates (or determines) the position (or coordinates) S of the wireless tag 3 based on the elementary geometry described with reference to FIGS. 4 and 5. Specifically, the processor 21 calculates (or determines) the position (or coordinates) S of the wireless tag 3 using the relational expression described with reference to FIG. 5.

For convenience of explanation, in FIG. 5 and FIG. 7, the symbols A and B are assigned to opposite points. That is, the point A in FIG. 5 corresponds to the point B in FIG. 7, and the point B in FIG. 5 corresponds to the point A in FIG. 7. The processor 21 calculates the first distance L by substituting the exterior angle ($\theta+\alpha$), the first difference Li, and the second distance Lr into formula (2) using the exterior angle ($\theta+\alpha$) as $\varphi$ illustrated in FIG. 5. Then, the processor 21 substitutes the first distance L, the first difference Li, and the second distance Lr into formula (1) to calculate the angle SBA ($\eta$). That is, the processor 21 uses the first distance L, the second distance Lr, and the first difference Li to calculate the first angle (angle SBA (angle $\eta$)) between the line connecting the first position A to the second position B and the line connecting the wireless tag 3 to the second position B.

Through the above calculations, in the triangle SAB formed by the position S of the wireless tag 3, the first position (or the point A), and the second position (or the point B), the angles (the exterior angle ($\theta+\alpha$) and the angle $\eta$) at the ends of the line AB with the length Lr corresponding to the second distance are obtained. The processor 21 calculates (or determines) the position (or coordinates) S of the wireless tag 3 based on elementary geometry by using the length Lr of the line AB and the angles (the exterior angle ($\theta+\alpha$) and the angle $\eta$) at the ends of the line AB. Thus, the processor 21 determines the position (or coordinates) S of the wireless tag 3.

Figure 8:
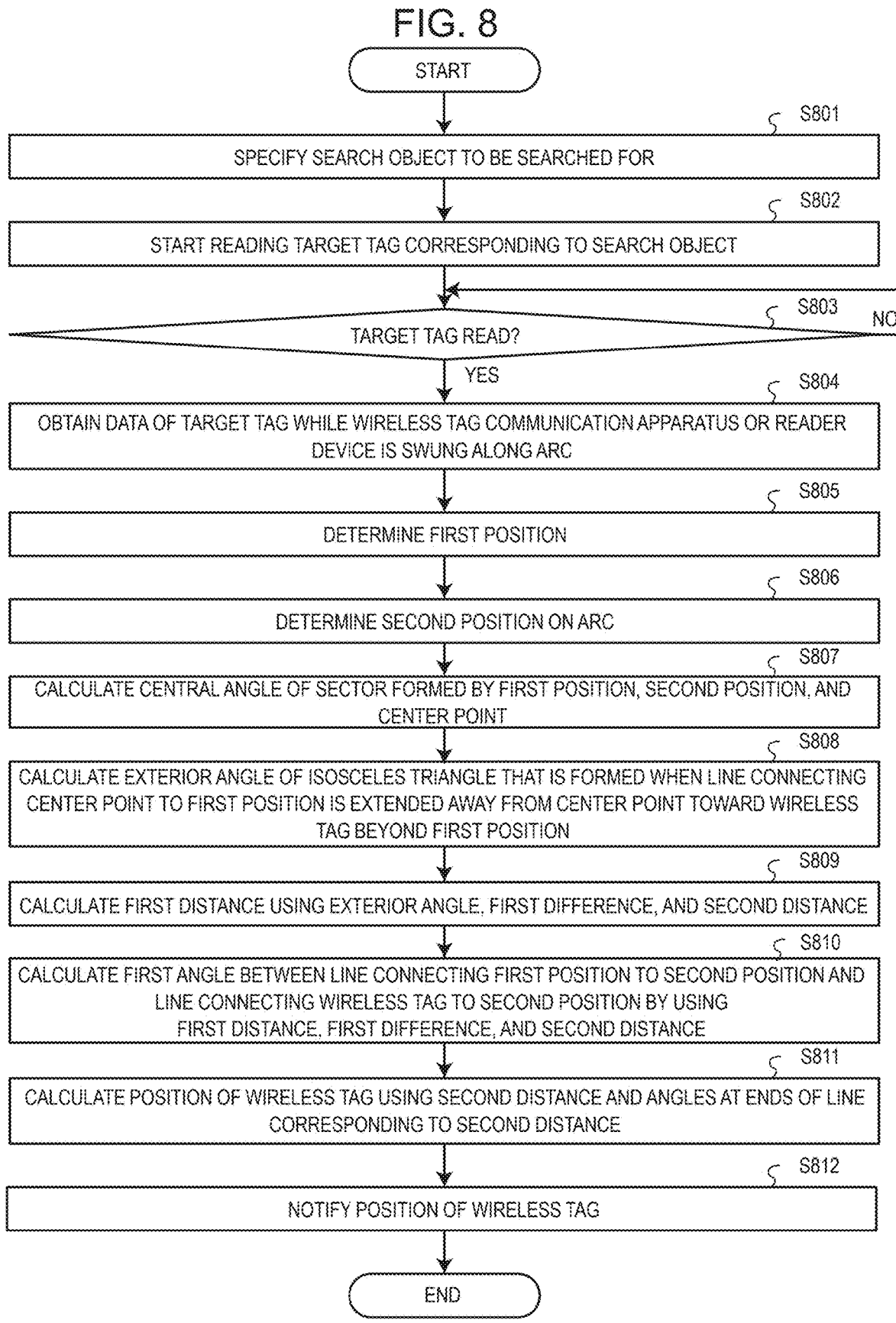
FIG. 8 is a flowchart illustrating a tag position estimation process.

The configurations according to the present embodiment are described above. Next, a process (hereinafter referred to as a tag position estimation process) or a method of estimating the position of the wireless tag 3 performed by the wireless tag communication apparatus 1 or the reader device 10 will be described. FIG. 8 is a flowchart illustrating an example of a tag position estimation process. The processor 21 of the wireless tag communication apparatus 1 or the reader device 10 may be configured to perform the steps in the flowchart of FIG. 8.

(Tag Position Estimation Process)

(Step S801)

A search object to be searched for is specified by an instruction input by the operator via the input device 15. The search object may be specified not only by a product name but also by any information item related to tag information. The processor 21 identifies a target wireless tag 3 corresponding to the specified search object. The target wireless tag 3 (hereinafter referred to as a target tag) is identified based on, for example, the identification information (ID) of the specified search object.

(Step S802)

The processor 21 starts a reading process of reading the target tag in response to an instruction from the operator to start the search. The processor 21 causes the wireless tag communication unit 23 to output a response request (or read command) as an output signal with a predetermined power level. The wireless tag communication unit 23 communicates with a wireless tag 3. Specifically, the wireless tag communication unit 23 receives a reception (or response)

signal, which is a response wave output from the wireless tag 3 in the reading area. Upon receiving the signal from the wireless tag 3, the wireless tag communication unit 23 extracts tag information from the reception signal and supplies the extracted tag information to the processor 21.

(Step S803)

The processor 21 determines whether the target tag has been read based on the tag information included in the reception signal received from the wireless tag 3 by the wireless tag communication unit 23. The processor 21 identifies identification information included in the tag information in the reception signal received by the wireless tag communication unit 23. The processor 21 determines whether the target tag has been read based on whether the identification information included in the reception signal matches the identification information of the target tag. When the target tag has not been read (No at step S803), the processor 21 repeats step S803 until the target tag is read. When the target tag has been read (Yes at step S803), the process proceeds to step S804. In other words, the processor 21 is configured to determine the position of the wireless tag 3 when the identification information included in the reception signal matches the identification information of the target tag.

(Step S804)

The processor 21 stores (or records) information read from the target tag as reading results in the memory 22. For example, the processor 21 stores information, such as a position, an orientation (or reading direction), a power level, and a phase value, in the memory 22 as reading results of the target tag. The position indicates the position (or apparatus position) of the wireless tag communication apparatus 1 or the reader device 10 at which the target tag is read.

For example, the processor 21 estimates the apparatus position by a self-position estimation method used in AR technologies based on images captured by the camera 26 or 35. Alternatively, the processor 21 may acquire information indicating the apparatus position that is estimated by the processor 31 of the information terminal device 13 based on images captured by the camera 35. The processor 21 may also determine the apparatus position based on information other than images captured by the camera 26 or 35.

The orientation (reading direction) indicates the orientation of the antenna (the orientation of the wireless tag communication apparatus 1 or the orientation of the reader device 10) when reading the RFID tag 3. The processor 21 obtains information indicating the orientation of the antenna detected by the sensor 24 or 34. Also, the processor 21 may detect the orientation of the antenna based on an image captured by the camera 26 or 35.

The power level indicates the strength of an output signal (or radio wave) output from the antenna when reading the RFID tag 3. The power level is set by the output setting circuit of the communication control circuit in accordance with an instruction from the processor 21.

The phase value indicates the phase of a radio wave of a reception signal received by the antenna from the target tag. The phase value is detected based on the reception signal from the target tag by a phase detection circuit included in the communication control circuit. The processor 21 acquires the phase value detected by the phase detection circuit.

(Step S805)

The processor 21 acquires data while the wireless tag communication apparatus 1 or the reader device 10 is swung along the arc ARC by a rotation operation performed by the operator. Specifically, as shown in FIG. 6, the processor 21 identifies two points (the points D and E shown in FIG. 6) that are on the arc ARC and at which radio waves with the same phase value are received. Note that the rotation operation is not limited to the example described above and may be, for example, an operation in which the operator holding the wireless tag communication apparatus 1 or the reader device 10 changes his/her orientation. In the rotation operation, the position detection sensor detects the position of the communication device 23 (or the wireless tag communication apparatus 1), which may be referred to as "apparatus position".

In addition, the processor 21 estimates the apparatus position (or coordinates) at the point D based on an output from the position detection sensor at the point D. Also, the processor 21 estimates the apparatus position (or coordinates) at the point E based on an output from the position detection sensor at the point E. The processor 21 uses the apparatus position at the point D and the apparatus position at the point E to determine the coordinates of the origin O and the coordinates of the midpoint between the point D and the point E, as shown in FIG. 7. The processor 21 uses the identified midpoint as the first position A.
(Step S806)

While the rotation operation is performed by the operator, as illustrated in FIG. 7, the processor 21 determines the second position B that differs from the first position A and is on the arc ARC centered on the origin O and having a radius corresponding to the distance between the origin O and the first position A. The processor 21 estimations (or calculates) the apparatus position (or coordinates) at the point B based on an output from the position detection sensor at the point B.
(Step S807)

The processor 21 calculates the distance Lr between the first position A and the second position B using the coordinates of the first position A and the coordinates of the second position B. Next, the processor 21 calculates the central angle θ of the sector AOB shown in FIG. 7 using the distance (or radius) between the origin O and the first position A and the calculated distance Lr.
(Step S808)

The processor 21 calculates the base angles (angle OAB and angle OBA) α in the isosceles triangle OAB shown in FIG. 7 using the central angle θ. Also, as shown in FIG. 7, the processor 21 calculates the exterior angle BAS (θ+α) of the isosceles triangle OAB using the central angle θ and the base angles α. As shown in FIG. 7, the exterior angle (θ+α) of the isosceles triangle OAB corresponds to the exterior angle BAS of the isosceles triangle OAB that is formed when the line connecting the center point O to the first position A is extended away from the center point O toward the wireless tag 3 beyond the first position A.
(Step S809)

The processor 21 calculates the first distance L by substituting the exterior angle (θ+α) for φ in formula (2) and substituting the first difference Li and the second distance Lr into formula (2).
(Step S810)

The processor 21 substitutes the first distance L, the first difference Li, and the second distance Lr into formula (1) to calculate the angle between the line connecting the first position A to the second position B and the line connecting the wireless tag 3 to the second position B. That is, the processor 21 calculates, as the first angle, the angle SBA in the triangle SBA shown in FIG. 7. Through the above process, for the triangle OAB shown in FIG. 7, the angles (the exterior angle (θ+α) and the angle η) at the ends of the line AB corresponding to the second distance Lr are obtained.
(Step S811)

The processor 21 calculates (or determines) the position (or coordinates) S of the wireless tag 3 by using the length Lr of the line AB and the angles (the exterior angle (θ+α) and the angle η) at the ends of the line AB. The position (or coordinates) S of the wireless tag 3 may be calculated by using the length Lr of the line AB and the angles (the exterior angle (θ+α) and the angle η) at the ends of the line AB based on any known calculation method, which is based on elementary geometry and uses the Pythagorean theorem, the Hellon's formula, and a rotation matrix. Therefore, descriptions of the calculation method are omitted. The processor 21 stores the calculated position (or coordinates) S of the wireless tag 3 in the memory 22.
(Step S812)

The processor 21 controls the display 14 to notify the operator of the position (or coordinates) of the wireless tag 3. The display 14 displays the position (or coordinates) of the wireless tag 3. Note that the notification of the position (or coordinates) of the wireless tag 3 to the operator is not necessarily performed using the display 14. For example, the processor 21 may notify the operator of the position (or coordinates) of the wireless tag 3 via a sound device.

As described above, the wireless tag communication apparatus 1 according to the present embodiment communicates with the wireless tag 3 via the communication device 23, detects the position of the communication device 23 (or the wireless tag communication apparatus 1) using the position detection sensor, and determines the position of the wireless tag 3 based on the phases of radio waves received through the communication between the wireless tag 3 and the communication device 23. While the communication device 23 is moved along the arc ARC, the wireless tag communication apparatus 1 determines, as the first position A, the midpoint between two positions at which radio waves with the same phase are received, determines a position that is on the moving path along the arc ARC and different from the first position A as the second position B, calculates the central angle θ of the sector OAB formed by the first position A, the second position B, and the arc ARC, and determines the position of the wireless tag 3 using the central angle θ, the first position A, and the second position B.

For example, when the first position A, the second position B, and the center point O of the arc ARC form the isosceles triangle OAB, the wireless tag communication apparatus 1 calculates the first distance L between the wireless tag 3 and the first position A by using the exterior angle (θ+α) of the isosceles triangle OAB that is formed when the line OA including the center point O is extended toward the wireless tag 3, and determines the position S of the wireless tag 3 by using the first distance L. Specifically, the wireless tag communication apparatus 1 according to the present embodiment determines the position S of the wireless tag 3 on the basis of the first distance L, the second distance Lr between the first position A and the second position B, and the phase shift (corresponding to Li) between the first position A and the second position B.

More specifically, the wireless tag communication apparatus 1 of the present embodiment calculates the first difference Li between the distance from the wireless tag 3 to the second position B and the first distance L based on the phase shift, calculates the second distance Lr using the first position A and the second position B, calculates the first distance L using the second distance Lr, the first difference Li, and the exterior angle ($\theta$+$\alpha$), calculates the first angle $\eta$ (angle SBA) between the line AB connecting the first position A to the second position B and the line SB connecting the wireless tag 3 to the second position B, and determines the position S of the wireless tag 3 using the second distance Lr, the exterior angle ($\theta$+$\alpha$), and the first angle $\eta$.

Thus, the wireless tag communication apparatus 1 of the present embodiment can calculate the position S of the wireless tag 3 using only measured values. Therefore, according to the wireless tag communication apparatus 1 of the present embodiment, the position S of the wireless tag 3 can be estimated with high accuracy. In addition, according to the wireless tag communication apparatus 1 of the present embodiment, since the first distance L can be calculated using the coordinates of the position S of the target tag and the coordinates of the first position A, in the search of the target tag, the direction from the apparatus position toward the target tag can be determined using the first distance L that is based on actual measurements rather than assumptions. As described above, according to the wireless tag communication apparatus 1 of the present embodiment, since information (e.g., the position of the target tag and the direction from the apparatus position toward the target tag) for the search of the target tag can be accurately determined, the efficiency of the search of the target tag can be improved.

(Variation)

Figure 9:
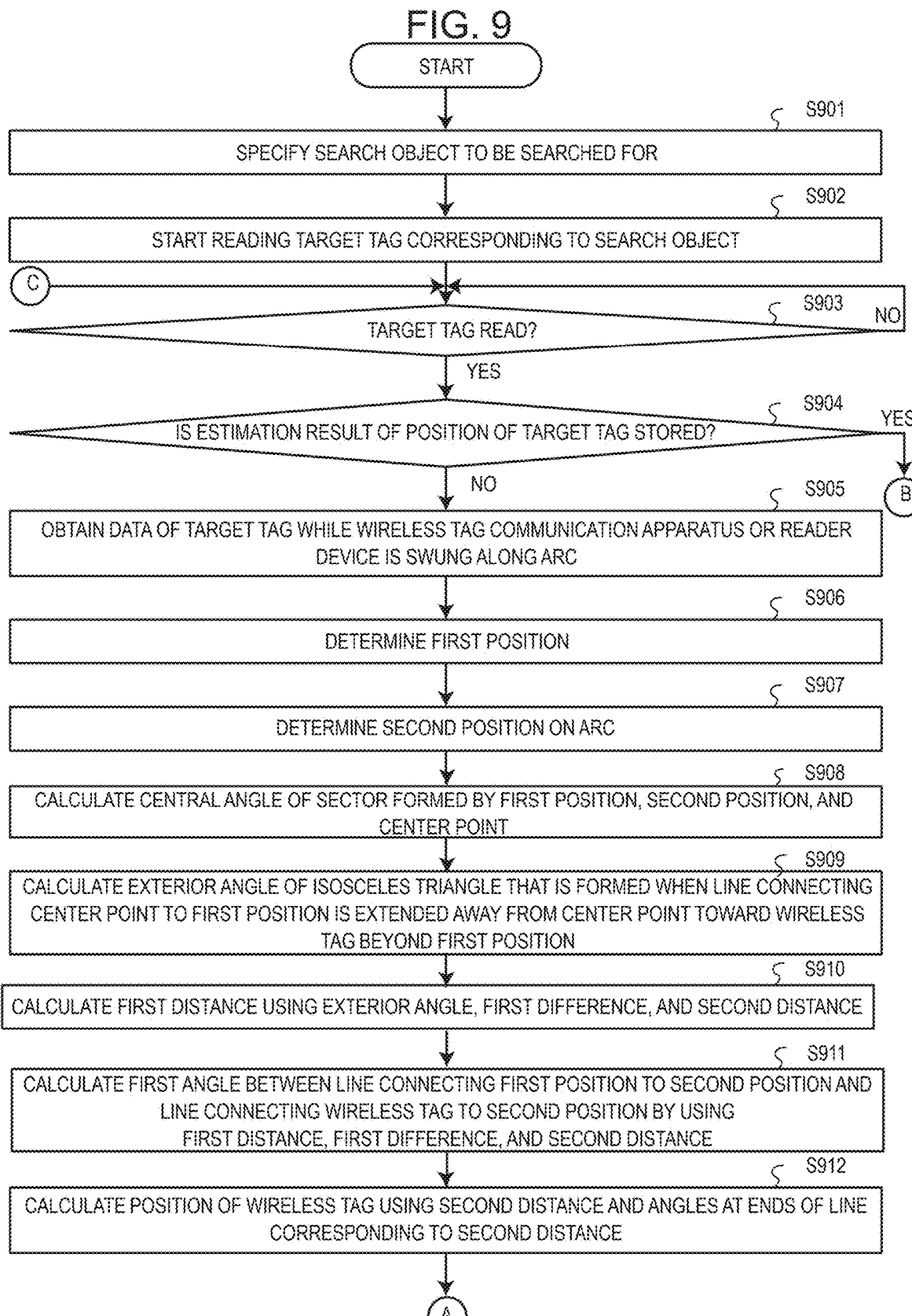
FIG. 9 is a flowchart illustrating a tag position estimation process according to a variation.
Figure 10:
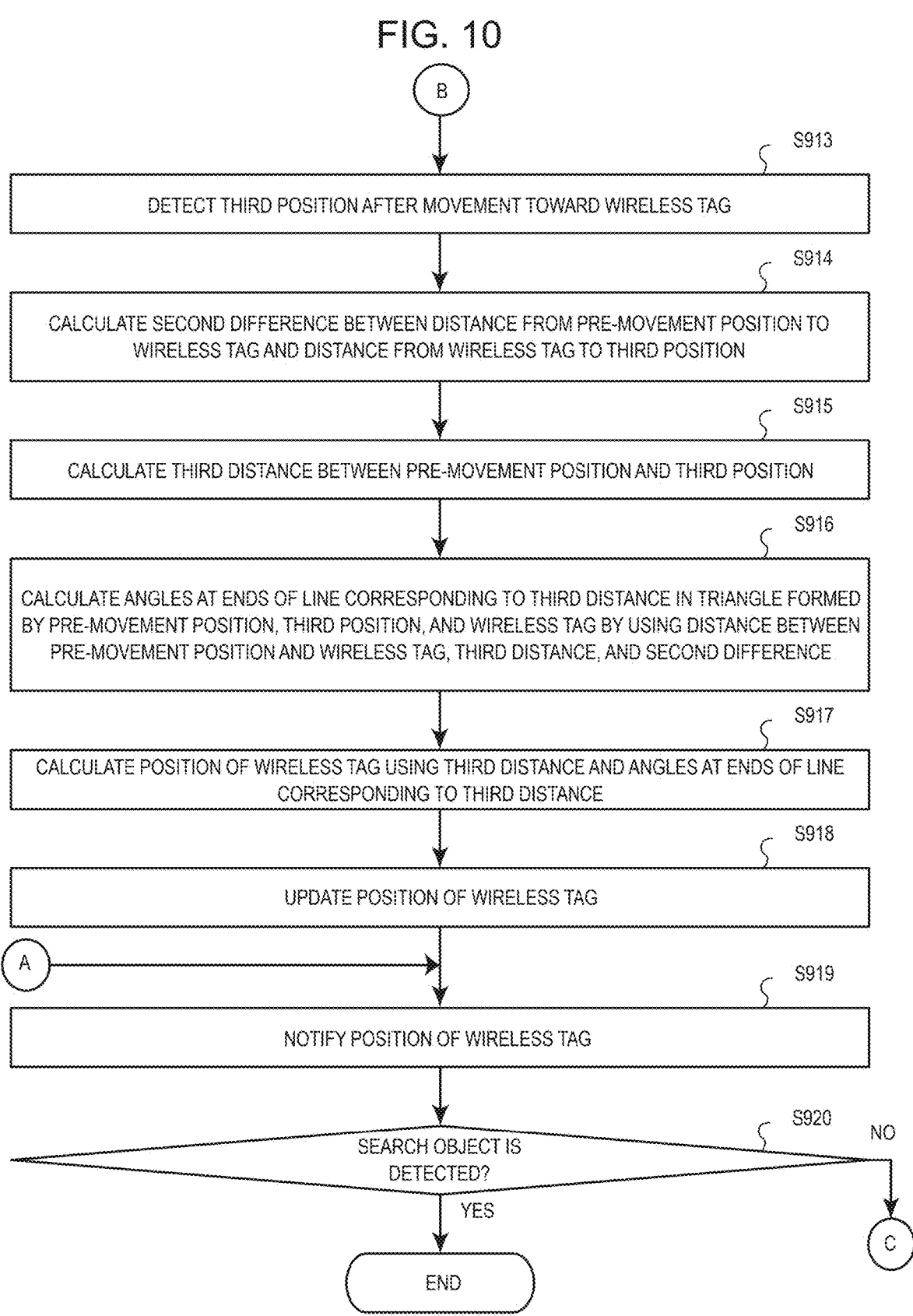
FIG. 10 is a flowchart illustrating the tag position estimation process according to the variation.

In this variation, in the search for a target tag, the position of the target tag is calculated again and updated in accordance with the movement of the wireless tag communication apparatus 1 or the reader device 10. A tag position estimation process according to the present variation will be described below. FIG. 9 and FIG. 10 are flowcharts illustrating an example of a tag position estimation process according to the present variation.

Note that steps S901 to S903 in FIG. 9 are similar to steps S901 to S903 in FIG. 8, and therefore descriptions of steps S901 to S903 are omitted. Steps S905 to S912 in FIG. 9 are similar to steps S804 to S811 in FIG. 8, and therefore descriptions of steps S905 to S912 are omitted. Step S919 in FIG. 10 is similar to step S812 in FIG. 8, and therefore descriptions of step S919 are omitted. As illustrated in FIGS. 9 and 10, after step S912, step S919 is performed.

(Tag Position Estimation Process)

(Step S904)

The processor 21 determines whether an estimation result (or coordinates) of the position S of the target tag is stored in the memory 22. When the estimation result (or coordinates) of the position S of the target tag is not stored in the memory 22 (No at step S904), the process proceeds to step S905. When the estimation result (or coordinates) of the position S of the target tag is stored in the memory 22 (Yes at step S904), the process proceeds to step S913. Prior to step S913, the wireless tag communication apparatus 1 or the reader device 10 is moved toward the wireless tag 3.

(Step S913)

After the wireless tag communication apparatus 1 or the reader device 10 is moved to a third position different from the first position A and the second position B, the communication device 23 communicates with the wireless tag 3 at the third position. The position detection sensor detects the position (or third position) of the wireless tag communication apparatus 1 or the reader device 10 after the movement toward the wireless tag 3. The processor 21 estimates the apparatus position (or coordinates) at the third position based on an output from the position detection sensor.

(Step S914)

After the movement of the wireless tag communication apparatus 1 or the reader device 10 from the first position A to the third position, the processor 21 calculates a second difference between the first distance L and the distance from the wireless tag 3 to the third position by using the phase shift of radio waves received through the communication between the wireless tag 3 and the communication device 23 at the first position A and the third position. In general, the processor 21 calculates a second difference between the distance from the wireless tag 3 to the pre-movement position before the movement to the third position and the distance from the wireless tag 3 to the third position. The second difference corresponds to a newly calculated distance Li.

(Step S915)

After the wireless tag communication apparatus 1 or the reader device 10 is moved from the first position A to the third position, the processor 21 calculates a third distance between the first position A and the third position using the first position A and the third position. In general, the processor 21 calculates a third distance between the third position and the pre-movement position at which the wireless tag communication apparatus 1 or the reader device 10 is located before being moved to the third position. The third distance corresponds to a newly calculated distance Lr.

(Step S916)

After the wireless tag communication apparatus 1 or the reader device 10 is moved from the first position A to the third position, the processor 21 uses the first distance L, the third distance (the newly calculated distance Lr), and the second difference (the newly calculated distance Li) to calculate a second angle between the line connecting the first position A to the third position and the line connecting the wireless tag 3 to the third position. Formula (1) or (2) is used to calculate the second angle. In this case, the second angle corresponds to the angle at one end of the line corresponding to the newly calculated distance Lr.

Also, after the wireless tag communication apparatus 1 or the reader device 10 is moved from the first position A to the third position, the processor 21 calculates a third angle between the line connecting the first position A to the third position and the line connecting the wireless tag 3 to the first position A by using the first distance L, the third distance (newly calculated distance Lr), and the second difference (newly calculated distance Li). Formula (1) or (2) is used to calculate the third angle. The third angle corresponds to the angle at the other end of the line corresponding to the newly calculated distance Lr.

In general, in the triangle formed by the pre-movement position, the third position, and the wireless tag 3, the processor 21 calculates the angles at the ends of the line corresponding to the third distance by using the distance between the pre-movement position and the wireless tag 3, the third distance, and the second difference. Formulas (1) and (2) are used to calculate the angles at the ends of the line corresponding to the third distance.

(Step S917)

The processor 21 calculates the position of the wireless tag 3 using the third distance and the angles at the ends of the line corresponding to the third distance. The method of calculating the position (or coordinates) of the wireless tag 3 is the same as that used in step S811, and therefore descriptions of the method are omitted.

(Step S918)

The processor 21 replaces the position (or coordinates) of the wireless tag 3 stored in the memory 22 with the newly calculated position (or coordinates) of the wireless tag 3. As a result, the position (or coordinates) of the wireless tag 3 stored in the memory 22 is updated to the newly calculated position (or coordinates) of the wireless tag 3.

(Step S920)

The processor 21 determines whether the search object (or the wireless tag 3) has been detected. For example, the processor 21 calculates the distance between the newly calculated position of the wireless tag 3 and the third position using the newly calculated position of the wireless tag 3 and the third position. When the calculated distance is less than or equal to a predetermined value (for example, 50 cm), the processor 21 determines that the search object (or the wireless tag 3) has been detected. The predetermined value is set in advance and stored in the memory 22. When the search object has been detected (Yes at step S920), the tag position estimation process ends.

When the calculated distance is greater than the predetermined value (for example, 50 cm), the processor 21 determines that the search object has not been detected. When the search object has not been detected (No at step S920), step S903 and subsequent steps are repeated.

As described above, the wireless tag communication apparatus 1 according to the variation of the present embodiment communicates with the wireless tag 3 at the third position different from the first position A and the second position B, detects the third position, calculates the second difference (or the newly calculated distance Li) between the first distance L and the distance from the wireless tag 3 to the third position using the phase shift of radio waves received through the communication between the wireless tag 3 and the communication device 23 at the first position A and the third position, calculates the third distance (or the newly calculated distance Lr) between the first position A and the third position using the first position A and the third position, calculates the second angle (or the angle at one end of the line corresponding to the newly calculated distance L) between the line connecting the first position A to the third position and the line connecting the wireless tag 3 to the third position using the first distance L, the third distance (or the newly calculated distance Lr), and the second difference (or the newly calculated distance Li), calculates the third angle (or the angle at the other end of the line corresponding to the newly calculated distance Lr) between the line connecting the first position A to the third position and the line connecting the wireless tag 3 to the first position A using the first distance L, the third distance (or the newly calculated distance Lr), and the second difference (or the newly calculated distance Li), and determines the position of the wireless tag 3 using the third distance, the second angle, and the third angle.

With the wireless tag communication apparatus 1 according to the variation of the present embodiment, the position of the target tag 3 can be calculated again and updated in accordance with the movement of the wireless tag communication apparatus 1 or the reader device 10. Thus, with the wireless tag communication apparatus 1 according to the variation of the present embodiment, the position of the target tag 3 can be updated every time the wireless tag communication apparatus 1 or the reader device 10 moves closer to the wireless tag 3. This in turn makes it possible to improve the accuracy of the position of the target tag 3 in accordance with the movement of the wireless tag communication apparatus 1 or the reader device 10. Other effects of the present variation are the same as those of the above embodiment, and therefore descriptions of those effects are omitted.

When the technical idea of the embodiment is implemented by a program, the program causes a computer to communicate with the wireless tag 3 via the communication device 23, detect the position of the communication device 23, and determine the position of the wireless tag 3 based on the phases of radio waves received through communication between the wireless tag 3 and the communication device 23. Also, the program causes the computer to determine, as the first position A, the midpoint between two positions that are on the arc ARC along which the communication device 23 is moved and at which radio waves with the same phase are received, determine, as the second position B, a position that is different from the first position A and is on the moving path of the communication device 23 along the arc ARC, calculate the central angle θ of the sector formed by the first position A, the second position B, and the arc ARC, and determine the position of the wireless tag 3 using the central angle θ, the first position A, and the second position B.

For example, the tag position estimation process can also be implemented by installing the program in a computer, such as the wireless tag communication apparatus 1 shown in FIG. 1, the upper device 19 on the network, or the reader device shown in FIG. 3, and loading the program into a memory. In this case, the program that can cause the computer to perform the tag position estimation process may be distributed on a non-transitory computer readable storage medium, such as a magnetic disk (e.g., a hard disk, an optical disk (e.g., CD-ROM or DVD or the like), or a semiconductor memory. Also, the program may be distributed via telecommunication. For example, the program may be downloaded via the Internet. The program implements a process corresponding to the tag position estimation process of the embodiment. The effects of the program are the same as those described in the above embodiment. Therefore, descriptions of the process implemented by the program and the effects of the program are omitted.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A wireless tag communication apparatus comprising:
   a communication device that faces a first direction and configured to communicate with a wireless tag and receive radio waves from the wireless tag;
   a sensor configured to detect positions of the wireless tag communication apparatus;
   a display that is connected to the communication device and faces a second direction that is opposite to the first direction when viewed from above;
   a grip connected to the communication device; and
   a processor configured to determine a position of the wireless tag based on phases of the radio waves, wherein
   the processor is configured to:
      determine, as a first position, a midpoint between two positions that are on an arc along which the wireless tag communication apparatus is moved, the phases of the radio waves received at the two positions being same,

21 determine a second position that is on the arc and different from the first position, calculate a central angle of a sector formed by the first position, the second position, and the arc, determine the position of the wireless tag using the central angle, the first position, and the second position, and control the display to display the determined position.

2. The wireless tag communication apparatus according to claim 1, wherein the first position, the second position, and a center point of the arc form an isosceles triangle, and the processor is configured to:

calculate a first distance between the wireless tag and the first position using an exterior angle of the isosceles triangle, the exterior angle being formed when a side of the isosceles triangle including the center point is extended toward the wireless tag, and determine the position of the wireless tag using the first distance.

3. The wireless tag communication apparatus according to claim 2, wherein the processor is configured to determine the position of the wireless tag based on the first distance, a second distance between the first position and the second position, and a phase shift between the radio waves received at the first position and the second position.

4. The wireless tag communication apparatus according to claim 3, wherein the processor is configured to:

calculate a first difference between a distance from the wireless tag to the second position and the first distance, calculate the second distance using the first position and the second position, calculate the first distance using the second distance, the first difference, and the exterior angle, calculate a first angle between a line connecting the first position to the second position and a line connecting the wireless tag to the second position, and determine the position of the wireless tag using the second distance, the exterior angle, and the first angle.

5. The wireless tag communication apparatus according to claim 4, wherein the processor is configured to, after the wireless tag communication apparatus is moved to a third position different from the first position and the second position:

calculate a second difference between the first distance and a distance from the wireless tag to the third position using a phase shift between the radio waves received through communication between the wireless tag and the communication device at the first position and the third position, calculate a third distance between the first position and the third position, calculate a second angle between a line connecting the first position to the third position and a line connecting the wireless tag to the third position using the first distance, the third distance, and the second difference, calculate a third angle between the line connecting the first position to the third position and a line connecting the wireless tag to the first position using the first distance, the third distance, and the second difference, and

newly determine the position of the wireless tag using the third distance, the second angle, and the third angle.

6. The wireless tag communication apparatus according to claim 5, further comprising:

a memory that stores the position of the wireless tag, wherein the processor is configured to update the position of the wireless tag stored in the memory with the newly determined position of the wireless tag.

7. The wireless tag communication apparatus according to claim 6, wherein the processor is configured to:

calculate a distance between the newly determined position of the wireless tag and the third position, and determine that the wireless tag has been detected when the distance between the newly determined position of the wireless tag and the third position is less than or equal to a predetermined value.

8. The wireless tag communication apparatus according to claim 2, wherein the processor is configured to:

calculate base angles of the isosceles triangle using the central angle, and calculate the exterior angle using the central angle and the base angles.

9. The wireless tag communication apparatus according to claim 1, wherein the processor is configured to calculate the central angle of the sector based on a distance between a center point of the arc and the first position and a distance between the first position and the second position.

10. The wireless tag communication apparatus according to claim 1, further comprising:

an input device, wherein the processor is configured to determine the position of the wireless tag when identification information in a reception signal received from the wireless tag matches identification information that is input through the input device.

11. A method performed by a wireless tag communication apparatus that includes a communication device that faces a first direction, a display connected to the communication device and facing a second direction opposite to the first direction when viewed above, and a grip connected to the communication device, the method comprising:

by the communication device, communicating with a wireless tag to receive radio waves from the wireless tag;

detecting positions of the wireless tag communication apparatus;

determining, as a first position, a midpoint between two positions that are on an arc along which the wireless tag communication apparatus is moved, phases of the radio waves received at the two positions being same;

determining a second position that is on the arc and different from the first position;

calculating a central angle of a sector formed by the first position, the second position, and the arc;

determining a position of the wireless tag using the central angle, the first position, and the second position; and displaying the determined position on the display.

12. The method according to claim 11, further comprising:

calculating a first distance between the wireless tag and the first position using an exterior angle of an isosceles triangle formed by the first position, the second position, and a center point of the arc, the exterior angle being formed when a side of the isosceles triangle including the center point is extended toward the wireless tag, wherein the position of the wireless tag is determined using the first distance.

13. The method according to claim 12, wherein the position of the wireless tag is determined based on the first distance, a second distance between the first position and the second position, and a phase shift between the radio waves received at the first position and the second position.

14. The method according to claim 13, further comprising:

calculating a first difference between a distance from the wireless tag to the second position and the first distance;

calculating the second distance using the first position and the second position;

calculating the first distance using the second distance, the first difference, and the exterior angle; and calculating a first angle between a line connecting the first position to the second position and a line connecting the wireless tag to the second position, wherein the position of the wireless tag is determined using the second distance, the exterior angle, and the first angle.

15. The method according to claim 14, further comprising, after the wireless tag communication apparatus is moved to a third position different from the first position and the second position:

calculating a second difference between the first distance and a distance from the wireless tag to the third position using a phase shift between the radio waves received through communication between the wireless tag and the wireless tag communication apparatus at the first position and the third position;

calculating a third distance between the first position and the third position;

calculating a second angle between a line connecting the first position to the third position and a line connecting the wireless tag to the third position using the first distance, the third distance, and the second difference;

calculating a third angle between the line connecting the first position to the third position and a line connecting the wireless tag to the first position using the first distance, the third distance, and the second difference; and newly determining the position of the wireless tag using the third distance, the second angle, and the third angle.

16. The method according to claim 15, further comprising:

updating the position of the wireless tag stored in a memory of the wireless tag communication apparatus with the newly determined position of the wireless tag.

17. The method according to claim 16, further comprising:

calculating a distance between the newly determined position of the wireless tag and the third position; and determining that the wireless tag has been detected when the distance between the newly determined position of the wireless tag and the third position is less than or equal to a predetermined value.

18. The method according to claim 12, further comprising:

calculating base angles of the isosceles triangle using the central angle; and calculating the exterior angle using the central angle and the base angles.

19. The method according to claim 11, wherein the central angle of the sector is calculated based on a distance between a center point of the arc and the first position and a distance between the first position and the second position.

20. A non-transitory computer readable storage medium storing a program for causing a processor of a wireless tag communication apparatus with a grip to perform a process including:

by a communication device to which the grip is connected, communicating with a wireless tag to receive radio waves from the wireless tag, the communication device facing a first direction;

detecting positions of the wireless tag communication apparatus;

determining, as a first position, a midpoint between two positions that are on an arc along which the wireless tag communication apparatus is moved, phases of the radio waves received at the two positions being same;

determining a second position that is on the arc and different from the first position;

calculating a central angle of a sector formed by the first position, the second position, and the arc;

determining a position of the wireless tag using the central angle, the first position, and the second position; and displaying the determined position on a display that faces a second direction opposite to the first direction when viewed from above.

* * * * *